(12) United States Patent
Nooli

(10) Patent No.: US 11,000,152 B2
(45) Date of Patent: May 11, 2021

(54) SYSTEM AND METHOD FOR OPERATING A HEATING ELEMENT OF AN APPLIANCE

(71) Applicant: PepsiCo, Inc., Purchase, NY (US)

(72) Inventor: Praveen Kumar Nooli, Coram, NY (US)

(73) Assignee: PepsiCo, Inc., Purchase, NY (US)

( * ) Notice: Subject to any disclaimer, the term of this patent is extended or adjusted under 35 U.S.C. 154(b) by 100 days.

(21) Appl. No.: 16/536,068

(22) Filed: Aug. 8, 2019

(65) Prior Publication Data
US 2021/0038019 A1 Feb. 11, 2021

(51) Int. Cl.
| | |
|---|---|
| A47J 36/32 | (2006.01) |
| A47J 37/06 | (2006.01) |
| A47J 27/00 | (2006.01) |
| G06Q 50/12 | (2012.01) |
| G05D 23/19 | (2006.01) |
| A47J 27/14 | (2006.01) |

(52) U.S. Cl.
CPC ............. *A47J 36/32* (2013.01); *A47J 27/004* (2013.01); *A47J 27/14* (2013.01); *A47J 37/0611* (2013.01); *G05D 23/1951* (2013.01); *G06Q 50/12* (2013.01); *A47J 2202/00* (2013.01)

(58) Field of Classification Search
None
See application file for complete search history.

(56) References Cited

U.S. PATENT DOCUMENTS

| | | | | |
|---|---|---|---|---|
| 6,102,031 | A | * | 8/2000 | Waters ...................... F24C 1/12 126/92 AC |
| 6,363,542 | B1 | * | 4/2002 | Pope, Sr. .................. E03D 9/05 4/209 R |
| 2005/0217540 | A1 | * | 10/2005 | Novak ................. A47B 83/001 108/50.01 |
| 2010/0126978 | A1 | * | 5/2010 | Semmes ............. F24D 19/1096 219/217 |
| 2010/0243641 | A1 | | 9/2010 | Ogasawara et al. |
| 2012/0097662 | A1 | | 4/2012 | Ewell, Jr. et al. |

(Continued)

FOREIGN PATENT DOCUMENTS

JP 2013053762 A * 3/2013

OTHER PUBLICATIONS

International Search Report and Written Opinion of the International Searching Authority in International Application No. PCT/US2020/043503, dated Oct. 9, 2020 (8 pages).

*Primary Examiner* — Ibrahime A Abraham
*Assistant Examiner* — John J Norton
(74) *Attorney, Agent, or Firm* — Sterne, Kessler, Goldstein & Fox P.L.L.C.

(57) ABSTRACT

A waffle maker having a base and a waffle mold supported by the base. The waffle mold has a first heating plate and a second heating plate, wherein the second heating plate is movable with respect to the first heating plate. A first heating element is arranged on the waffle mold for heating the first and second heating plates. The waffle maker further includes a sensor configured to detect motion in a detection area. A control unit of the waffle maker is in communication with the sensor and the first heating element, such that when the presence of a human is detected in the detection area, the control unit heats the first heating element to a predetermined pre-heat temperature.

16 Claims, 7 Drawing Sheets

(56) References Cited

U.S. PATENT DOCUMENTS

| | | | |
|---|---|---|---|
| 2012/0103963 A1* | 5/2012 | Milfeldt | F24H 3/002 |
| | | | 219/218 |
| 2012/0132635 A1 | 5/2012 | Mishra | |
| 2014/0208957 A1* | 7/2014 | Imai | F24C 7/082 |
| | | | 99/342 |
| 2015/0230659 A1 | 8/2015 | Hoare et al. | |
| 2018/0338503 A1 | 11/2018 | Wiker et al. | |

* cited by examiner

SYSTEM AND METHOD FOR OPERATING A HEATING ELEMENT OF AN APPLIANCE

FIELD

Embodiments described herein generally relate to a system and method for operating a heating element of an appliance for preparing food or beverages. Specifically, embodiments described herein relate to systems and methods for operating a heating element of an appliance based upon detection of a presence of a human by a sensor.

BACKGROUND

Various appliances for preparing food or beverages include at least one heating element that is used to heat or cook the food or beverage. Examples of such appliances include waffle makers, toasters, heating trays, electric kettles, panini presses, and electric grills or griddles, among others. The appliances may be used as consumer products in a household and may be kitchen appliances, or the appliances may be used in a commercial setting, such as in a restaurant, bar or the like. In order to quickly prepare food, it can be useful to pre-heat the appliance prior to the time the appliance is used to prepare food. However, if the heating element is active even when the appliance is not being used to prepare food, the appliance may consume a considerable amount of electricity and the useful life of the appliance may be reduced.

Accordingly, there is a need in the art for appliances having heating elements for preparing food that operate efficiently to allow for pre-heating of the appliance without wasting electricity.

BRIEF SUMMARY OF THE INVENTION

Some embodiments described herein relate to a waffle maker that includes a base, a waffle mold supported by the base and having a first heating plate and a second heating plate, wherein the second heating plate is movable with respect to the first heating plate. The waffle maker further includes a first heating element arranged on the waffle mold for heating the first and second heating plates and a sensor configured to detect motion in a detection area. The waffle maker also includes a control unit in communication with the sensor and the first heating element, wherein when motion is detected in the detection area, the control unit heats the first heating element to a predetermined pre-heat temperature.

Some embodiments described herein relate to appliance for heating food that includes a proximity sensor configured to detect a presence of a human in a detection area. The appliance further includes a first heating plate having a first heating element, and a second heating plate having a second heating element. The appliance further includes a control unit in communication with the proximity sensor and the first and second heating elements, wherein when the presence of a human is detected in the detection area, the control unit heats the first heating element to a first predetermined pre-heat temperature, and heats the second heating element to a second predetermined pre-heat temperature that is different than the first predetermined pre-heat temperature.

Some embodiments described herein relate to a method of operating a heating element of an appliance for heating food that includes maintaining the appliance in a stand-by mode in which a heating element is at an ambient temperature, detecting motion in a detection area by a sensor of the appliance, and activating the heating element of the appliance when the motion is detected by the sensor such that the heating element is heated to a pre-heat temperature.

In any of the various embodiments discussed herein, the waffle mold may include a hinge configured to allow the waffle mold to rotate 180 degrees about a longitudinal axis of the waffle maker.

In any of the various embodiments discussed herein, the detection area may be an area within 15 feet of the proximity sensor.

In any of the various embodiments discussed herein, the sensor is a proximity sensor configured to detect a presence of a human in the detection area. In some embodiments, the proximity sensor may be a passive infrared sensor or a mmwave sensor. In some embodiments, the proximity sensor may be configured to determine locations of a plurality of humans in the detection area.

In any of the various embodiments discussed herein, the waffle maker may further include a temperature sensor configured to determine a temperature of the waffle mold.

In any of the various embodiments discussed herein, the waffle maker may further include a second heating element, wherein the first heating element is arranged on the first heating plate of the waffle mold, and the second heating element is arranged on the second heating plate of the waffle mold.

In any of the various embodiments discussed herein, the first heating element and the second heating element may be heated by the control unit simultaneously.

In any of the various embodiments discussed herein, when the appliance is used to heat food, the first heating element may be heated for a first cooking time, and the second heating element may be heated for a second cooking time that differs from the first cooking time.

In any of the various embodiments discussed herein, the appliance may be a waffle maker.

In any of the various embodiments discussed herein, a method for operating a heating element of an appliance may include heating the heating element to a predetermined cooking temperature that is higher than the pre-heat temperature.

In any of the various embodiments discussed herein, a method for operating a heating element of an appliance may include heating the heating element to the predetermined cooking temperature for a predetermined cooking time.

In any of the various embodiments discussed herein, a method for operating a heating element of an appliance may include detecting a presence of a human by the sensor upon completion of the predetermined cooking time, and heating the heating element to the pre-heat temperature when the presence of a human is detected.

In any of the various embodiments discussed herein, a method for operating a heating element of an appliance may include adjusting a temperature of the heating element based upon a number of humans in the detection area as detected by the sensor.

In any of the various embodiments discussed herein, a method for operating a heating element of an appliance may include deactivating the heating element when the presence of a human is not detected by the sensor.

In any of the various embodiments discussed herein, a method for operating a heating element of an appliance may include generating usage data for the appliance by determining a time of use of the appliance and determining a number of uses of the appliance over a period of time, and activating the heating element based at least in part on the usage data.

In any of the various embodiments discussed herein, a method for operating a heating element of an appliance may include generating usage data for the appliance by determining a number of humans in the detection area by the sensor of the appliance, determining an number of uses of the appliance and comparing the number of humans to the number of uses of the appliance.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
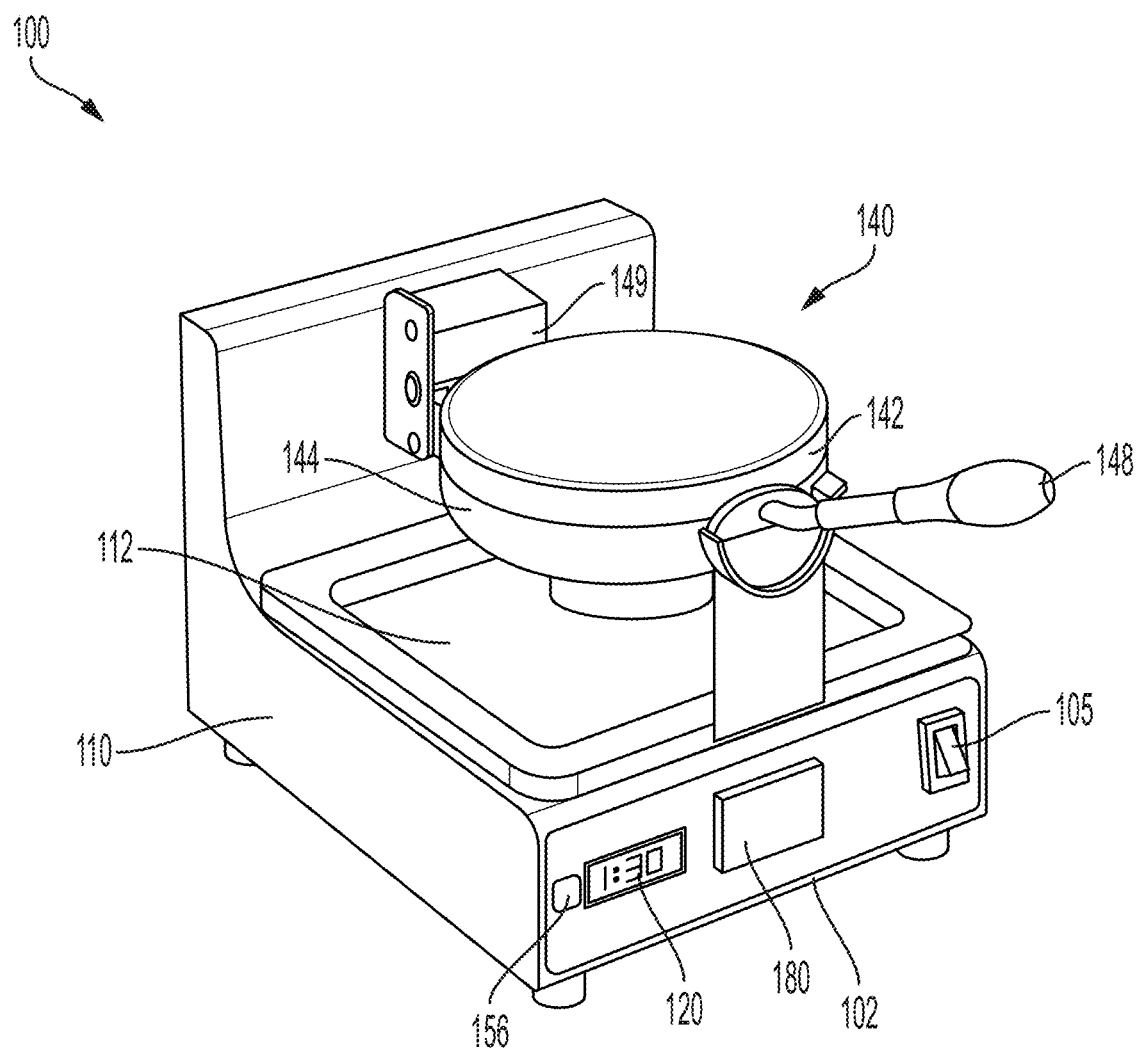
FIG. 1 shows a perspective view of a waffle maker in a closed configuration according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Numerous appliances include a heating element for use in preparing food or beverage items, including waffle makers, toasters, heating trays, electric kettles, panini presses, and electric grills or griddles, among others. In order to use such an appliance, a user generally must activate or "turn on" the appliance and wait while the heating element heats to the desired cooking temperature for preparing a particular food or beverage item. Waiting for the heating element to heat to a cooking temperature, which may be for example, 350° F. to 450° F., from ambient or "room" temperature may be time consuming and inconvenient. Waiting for the appliance to heat may increase the total amount of time required to prepare food. If a user has limited time for preparing and eating a meal, the user may not have enough time to wait for the heating element of the appliance to heat and to cook the food and the user may forego use of the appliance.

In a commercial setting, it may be necessary to repeatedly use an appliance to quickly make a large quantity of food for customers. However, waiting for an appliance to heat to the desired temperature may slow the rate at which food can be prepared. Customers may be unwilling to wait a long time for food to be prepared and may have a bad experience if their food is not prepared in a timely manner. Further, after a first food item is prepared, the heating element of many appliances generally deactivates and cools to ambient temperature unless the heating element is reactivated for further use of the appliance. As a result, if the appliance is not continually used, the heating element may repeatedly heat and cool, and each time the appliance is used the operator may have to wait for the heating element to heat to the cooking temperature to prepare additional food items. These issues may particularly arise when the appliance is unattended and meant for the consumer to operate.

Some appliances may include a pre-heat setting that maintains the heating element of the appliance at a pre-heat temperature that is above ambient temperature and which may be below the cooking temperature. While pre-heating the appliance may decrease the amount of time required for the heating element to heat to the cooking temperature, maintaining the heating element at an elevated temperature when the appliance is not in use to prepare food may waste energy and increases utility expenses. Further, the heating element and other components of the appliance can wear and degrade from repeated heating cycles. For example, cooking surfaces of the appliance may include coatings that can erode over time from extended use of the appliance. Thus, the repeated heating and cooling of the heating element, and the continued operation of the heating element over time may wear out the heating element. In order to maximize the longevity and usable life of the appliance, it may be desirable to operate the heating element as efficiently as possible and minimize unnecessary heating and cooling of the heating element.

One example of an appliance for preparing food and having a heating element is a waffle maker. While the present application refers herein primarily to a waffle maker, the present application is not limited to waffle makers, and one of ordinary skill in the art would readily understand that the principles set forth herein can be applied to any of various other appliances having heating elements for preparing food or beverages, including, but not limited to, toasters, heating trays, electric kettles, panini presses, electric grills, griddles, and similar heating appliances.

Some embodiments described herein relate to an appliance having a sensor for detecting motion in a detection area, wherein the heating element is automatically heated to a pre-heat temperature when motion is detected in the detection area. In this way, the appliance is heated only when a potential user or customer is present that may wish to use the appliance. Further, the appliance may maintain the heating element at the pre-heat temperature upon completion of a cooking cycle if motion is still detected in the detection area by the sensor. Thus, the heating element may remain heated after use, rather than cooling to ambient temperature. Further, when motion is no longer detected by the sensor, the appliance may deactivate the heating element to allow the heating element to cool to ambient temperature in order to conserve electricity.

Some embodiments described herein relate to a waffle maker 100 having a control unit 150 in communication with a sensor 180 and a heating element 130. When motion is detected by sensor 180, control unit 150 of waffle maker 100 may heat heating element 130 to a pre-heat temperature. In this manner, when waffle maker 100 is used by a consumer to prepare food, waffle maker 100 may already be pre-heated to minimize the time required for heating element 130 to reach the cooking temperature. Further, by activating heating element 130 only when motion is detected, waffle maker 100 may be energy efficient and may optimize the useful life of waffle maker 100.

Figure 2:
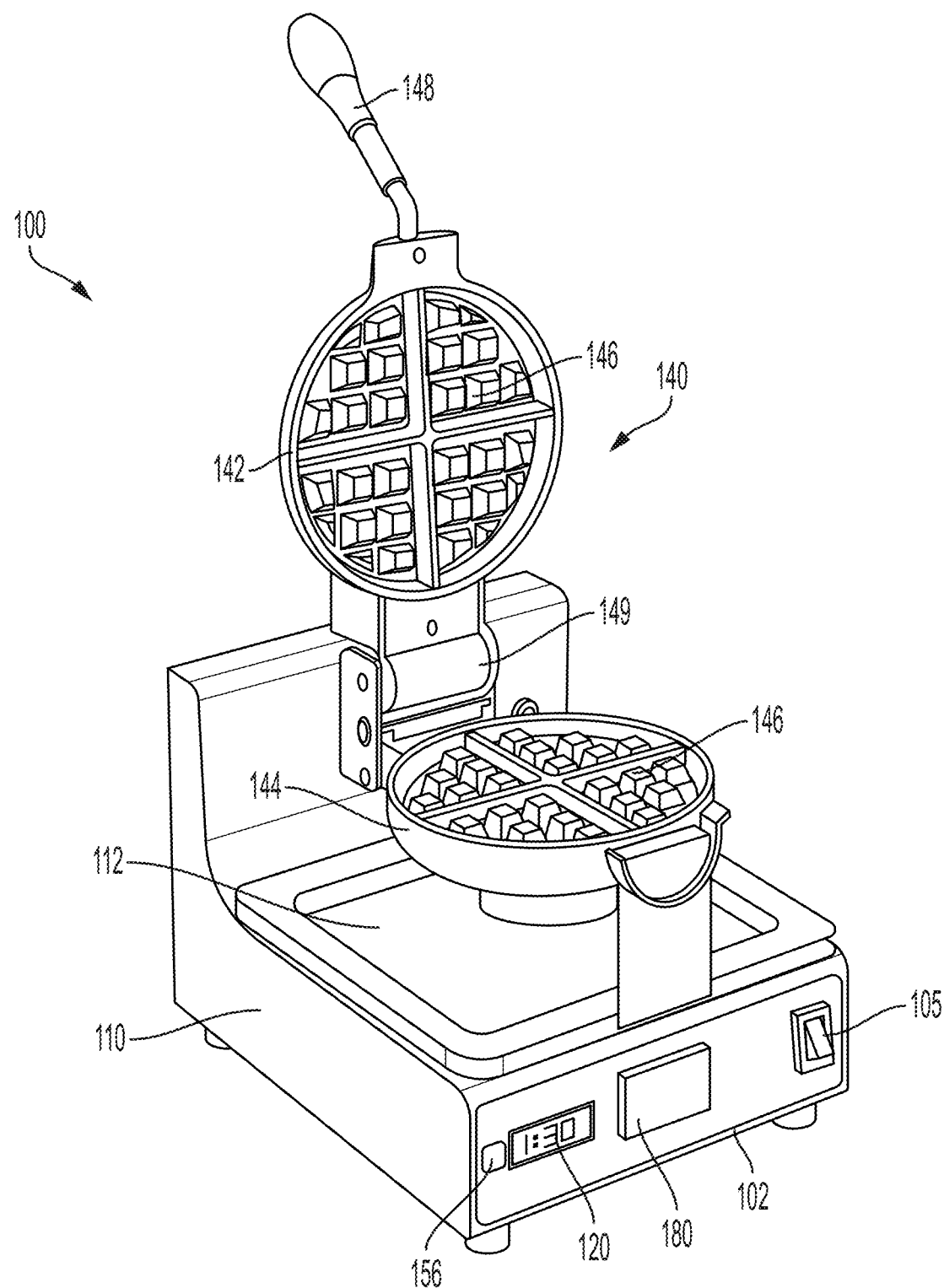
FIG. 2 shows a perspective view of the waffle maker of FIG. 1 in an open configuration.
Figure 3:
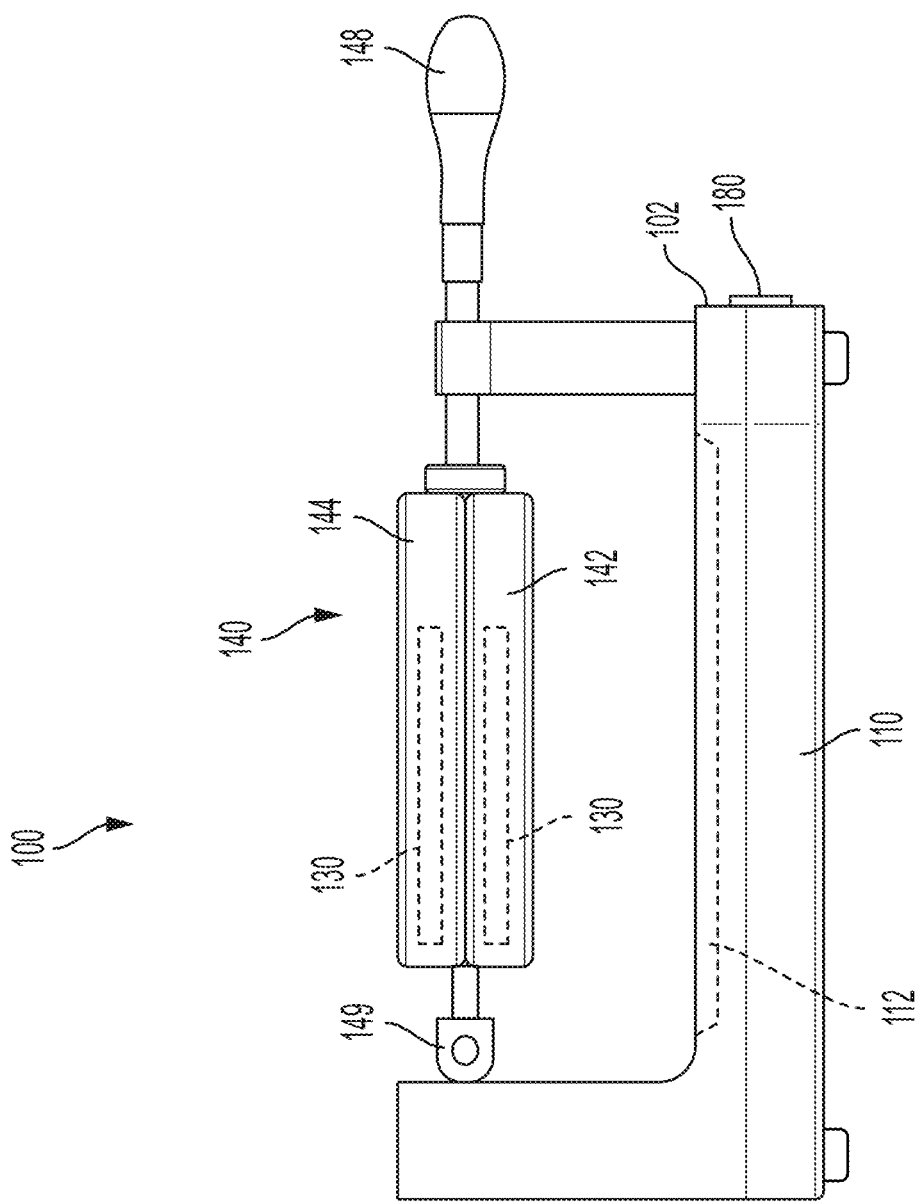
FIG. 3 shows a side view of the waffle maker of FIG. 1 in a closed configuration.

In some embodiments, waffle maker 100 includes a base 110 that supports a waffle mold 140 for preparing a waffle, as shown in FIGS. 1-3. Base 110 may include a drip tray 112 positioned beneath waffle mold 140 so as to collect any excess batter that spills or drips from waffle mold 140. Excess batter may be the result of a user overfilling waffle mold 140 or due to improper pouring of the batter by a user.

Waffle mold 140 includes a first heating plate 142 and a second heating plate 144. First heating plate 142 may be movable with respect to second heating plate 144. Each heating plate 142, 144 defines a mold pattern 146 for receiving batter and shaping the batter into a waffle. In some embodiments, first heating plate 142 can be pivotable relative to second heating plate 144 about a hinge 149, so that waffle mold 140 may be selectively arranged in an open or closed configuration. In the open configuration, first heating plate 142 is pivoted away from second heating plate 144 so that an interior of waffle mold 140 is accessible by a user so that batter for making a waffle may be poured into mold pattern 146 of second heating plate 144. With batter poured into second heating plate 144 of waffle mold 140, waffle mold 140 may be moved to the closed configuration by pivoting first heating plate 142 such that first and second heating plates 142, 144 are in facing engagement, as shown in FIG. 1, enclosing the batter within waffle mold 140 for cooking the batter.

Each heating plate 142, 144 may define a mold pattern 146 to form a waffle having a desired shape and pattern, as shown in FIG. 2. Heating plates 142, 144 may each have a shape that is circular, square, rectangular, oval, triangular, among various other shapes, and may be shaped similarly to a leaf, a flower, a heart, a state, a tree, an animal, among other ornamental or decorative shapes. In some embodiments, mold pattern 146 may be for example a grid, such as a square or triangular grid. Heating plates 142, 144 may be made of any of various materials, including metals or ceramics. In some embodiments, each heating plate 142, 144 further includes a non-stick surface, and may be coated with a non-stick coating, such as polytetrafluoroethylene (PTFE) or Teflon®, among others.

Waffle mold 140 may include a single heating element 130 for heating one or both heating plates 142, 144. In some embodiments, first heating plate 142 may include a first heating element 130 and second heating plate 144 may include a second heating element 130, as shown in FIG. 3. Each heating element 130 may be an electrical resistance heating element. Heating element 130 serves to heat first and second heating plates 142, 144 that contact the batter in order to cook the batter. Heating elements 130 can be heated to the same temperature or different temperatures. Further, heating elements 130 can be heated independently, and can be heated simultaneously or in an alternating fashion.

Waffle mold 140 may be rotatable about a longitudinal axis X of waffle maker 100, as shown in FIG. 1. Waffle mold 140 may be connected to base 110 by a hinge 149, and waffle mold 140 may be capable of rotating about a hinge 149. Waffle mold 140 may be able to rotate 180 degrees about longitudinal axis X In a resting position, waffle mold 140 may be arranged with first heating plate 142 positioned above second heating plate 144. Waffle mold 140 may be rotated 180 degrees about longitudinal axis X into a cooking position, in which second heating plate 144 is positioned above first heating plate 142, i.e., waffle mold 140 is flipped upside-down. In this way, waffle maker 100 may evenly distribute the batter in waffle mold 140 so the resulting waffle conforms to the shape of waffle mold 140 and so that the waffle is evenly cooked on both sides. In some embodiments, hinge 149 for pivoting heating plates 142, 144 between open and closed configurations may also serve to allow waffle mold 140 to rotate 180 degrees about the longitudinal axis X between resting and cooking positions. In some embodiments, separate hinges 149 may be used.

In some embodiments, waffle mold 140 may include a handle 148 extending longitudinally from first and/or second heating plate 142, 144 for a user to grasp in order to pivot waffle mold 140 between the open and closed configurations, and to provide the user with an area to grasp for rotating waffle mold 140. Handle 148 may be formed of an insulating material so that handle 148 is not heated when heating plates 142, 144 are heated, allowing handle 148 to be comfortably grasped by a consumer.

Waffle maker 100 may include a power switch 105 for "turning on" waffle maker 100. When waffle maker 100 is turned on, electricity is provided to waffle maker 100 from a power source, such as an electrical outlet or a generator, and waffle maker 100 may remain in a "stand-by mode" in which heating element 130 remains at ambient or room temperature. Waffle maker 100 may remain in stand-by mode until motion is detected by a sensor 180. In this way, waffle maker 100 conserves energy by maintaining heating element 130 in an inactive state until motion is detected, indicating a presence of a potential customer.

Figure 4:
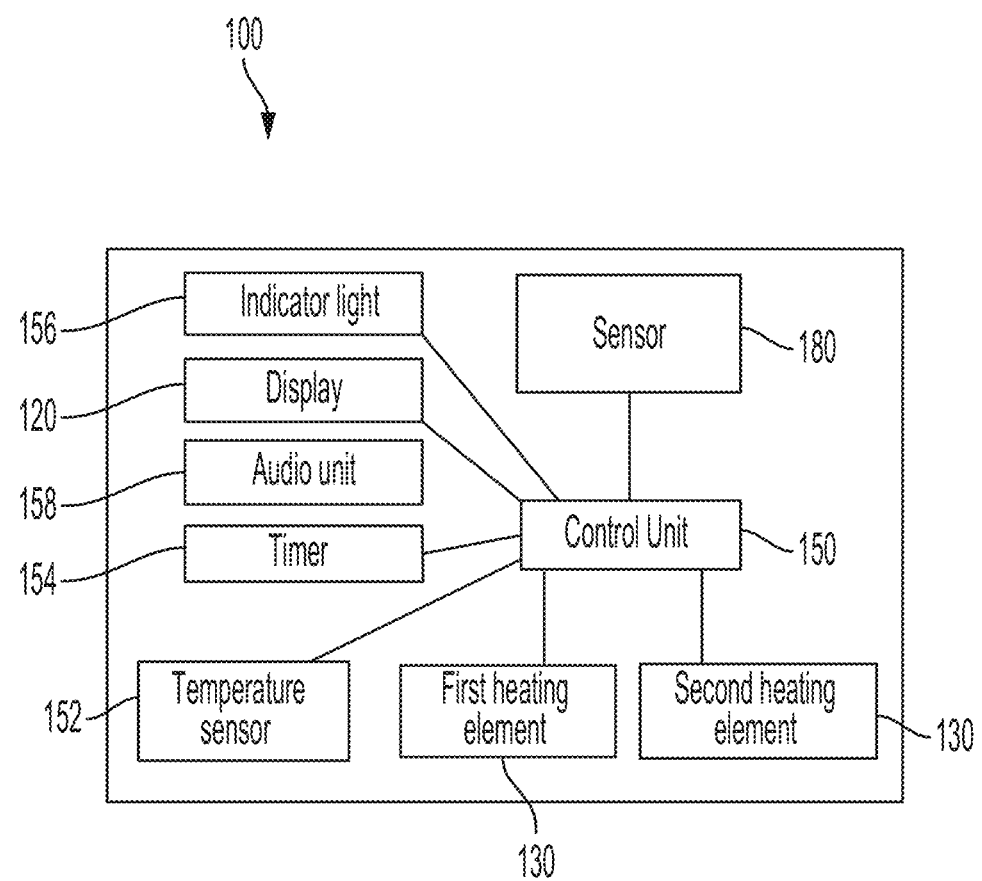
FIG. 4 shows a schematic diagram of the components of an appliance according to embodiments.

A control unit 150 of an appliance 100, such as a waffle maker as described herein, controls operation of appliance 100. Control unit 150 is in communication with a heating element(s) 130 of appliance 100, as shown for example in FIG. 4. In some embodiments, a temperature sensor 152 may also be in communication with control unit 150 for determining a temperature of each heating element 130 or a heating plate 142, 144 heated by a heating element 130. In embodiments having multiple heating elements 130, each heating element 130 may include a separate temperature sensor 152 in contact with or adjacent to the heating element 130. In embodiments having multiple heating elements 130 it may be desired to maintain each heating element 130 at a different temperature, or to activate each heating element 130 for a different period of time, as discussed in further detail below.

Control unit 150 determines the cooking time for preparing a food item. In some embodiments, the cooking time is predetermined (e.g., 2 minutes). Control unit 150 may include a timer 154 for monitoring the cooking time, or control unit 150 may serve as the timer. When appliance 100 is a waffle maker, cooking time may begin when waffle mold 140 is rotated 180 degrees into the cooking position. When cooking time is complete, an indicator light 156 of appliance 100 may illuminate to alert the user that the food is ready. Appliance 100 may alternatively or additionally include an audio unit 158, such as a speaker, that plays an audible alert, such as a tone, when the cooking time is complete.

In some embodiments, the cooking time is not predetermined and instead control unit 150 may adjust cooking time from a default cooking time based upon the use of appliance 100. For example, sensor 180 of appliance 100 may be configured to detect a number of humans in a detection area, and when multiple humans are detected, control unit 150 may increase the cooking temperature which allows for a corresponding decrease in cooking time to prepare the food, allowing food to be prepared more quickly.

In some embodiments, appliance 100 includes a display 120 for displaying the cooking time and which may indicate when the cooking time is complete. Display 120 may be arranged on base 110 of appliance 100, as shown for example in FIG. 1. Display 120 may display a countdown of the cooking time. In some embodiments, display 120 may be used to display additional instructions or to indicate the settings of appliance 100. In some embodiments, display 120 may be an alphanumeric display that simply displays the cooking time. However, in some embodiments, display 120 may be an electronic display screen, such as a liquid crystal display (LCD), light-emitting diode (LED) display, or organic-LED (OLED) display, and may be a touch-screen display. In such embodiments, display 120 may show instructions, the cooking time, settings, instructions, images or videos, and usage data and statistics, among other information related to the operation and use of appliance 100.

Appliance 100 further includes a sensor 180 configured to detect motion. Sensor 180 is in communication with control unit 150 such that control unit 150 receives information from sensor 180. When no motion is detected by sensor 180, control unit 150 maintains heating element 130 in an inactive state such that heating element 130 is at ambient temperature. When motion is detected by sensor 180, control unit 150 can activate heating element 130 so as to heat heating element 130 to a pre-heat temperature. Pre-heat temperature may be predetermined or may be adaptively selected, as will be discussed herein. When appliance 100 is in use for preparing a food item, control unit 150 heats heating element 130 to a cooking temperature. The cooking temperature may also be predetermined or may be adaptively selected, as discussed herein. The pre-heat temperature is less than the cooking temperature. For example, in one embodiment, the pre-heat temperature may be about 380° F. and the cooking temperature may be about 400° F.

In some embodiments, sensor 180 may be a proximity sensor configured to detect an object within a detection area and a distance of the object from appliance 100. Sensor 180 may further be configured to detect a presence of a human in a detection area. Sensor 180 may be configured to detect a number of humans in the detection area and the locations of the humans in the detection area.

In some embodiments, sensor 180 may be arranged on a front portion 102 of appliance 100 so that sensor 180 may detect or "view" the area in front of and around appliance 100. Further, placement of sensor 180 on a front portion 102 of appliance 100 helps to ensure that sensor 180 is not obstructed by other portions of appliance 100 or by other objects placed on the counter or support surface on which appliance 100 is positioned.

Figure 5:
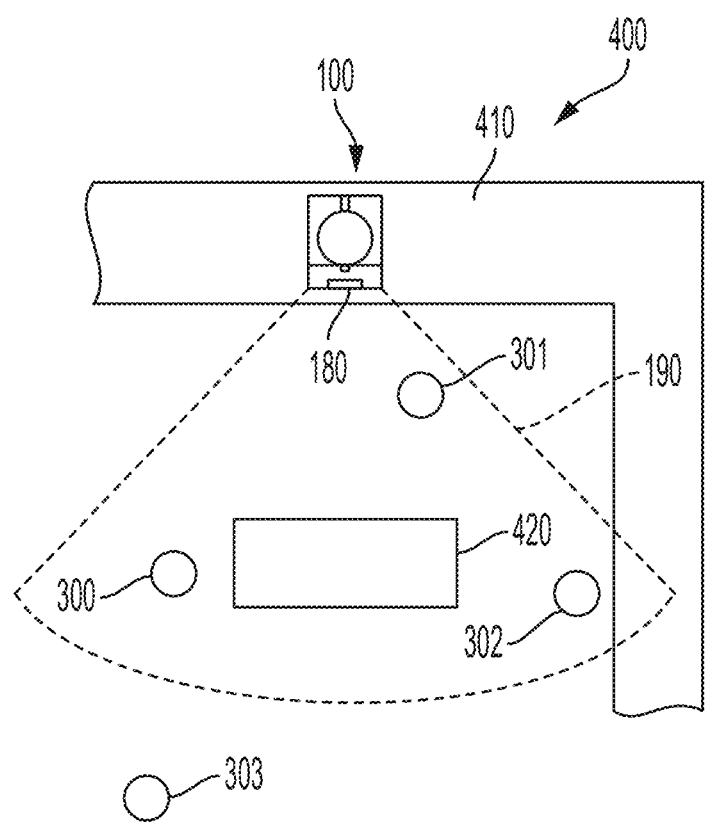
FIG. 5 shows a schematic diagram of a detection area of an appliance according to an embodiment.

In some embodiments, sensor 180 is configured to detect a presence of a consumer with a detection area 190, as shown for example in FIG. 5. Detection area 190 may be a region around sensor 180, such as, for example, a zone within about 10 feet, 15 feet, or 20 feet of sensor 180. Sensor 180 may be configured to detect a human within 360 degrees of sensor 180, or may be configured to only detect humans in a narrower range, such as 180 degrees, 160 degrees, 140 degrees, etc., in the area in front of sensor 180. For example, as shown in FIG. 5, appliance 100 may be a waffle maker positioned on a counter 410 in a breakfast area 400 of a hotel. Detection area 190 may be a region within a specific distance of sensor 180 of appliance 100 so as to only detect people within breakfast area 400. Thus, consumers 300, 301, 302 within detection area 190 are detected by sensor 180, and consumers 303 too distant from sensor 180 (and outside of detection area 190) are not detected. Such consumers 303 may not be in breakfast area 400, and may instead be passing by breakfast area 400 through a lobby or hallway, and thus it is not desired to detect such a person for purposes of operating heating element 130 of appliance 100. Sensor 180 may be specifically configured to detect humans, including adults or children, and can differentiate between humans and animals, such as a pet, or objects, such as furniture in detection area 190, e.g., counters 410, 420, chairs, stools, and appliances, among other objects.

In some embodiments, sensor 180 can be a passive infrared sensor (PIR). PIR sensor may detect a heat signature of a human to distinguish humans from other objects, such as furniture, luggage, appliances, strollers, and the like. In some embodiments, sensor 180 can be a millimeter wave sensor ("mmwave sensor") configured to detect a silhouette of a human body. In some embodiments, other types of sensors may be used, such as sensors based on radio detection and ranging (RADAR) or light detection and ranging (LIDAR). One of ordinary skill in the art will appreciate that other types of sensors can be used to identify motion or the presence of a human in a detection area. In some embodiments, sensor 180 may continually monitor for motion or the presence of humans in detection area 190, or sensor 180 may periodically monitor for motion or the presence of humans. Further, sensor 180 can be configured to determine the location of the human with respect to sensor 180, and may be able to determine the location of multiple humans in detection area 190.

In some embodiments, pre-heat temperature and/or cooking temperature may be adaptively selected. In such embodiments, sensor 180 may determine the number of humans within detection area 190. In some embodiments, control unit 150 may determine the relative locations of humans in detection area 190 based on information received from sensor 180, and may adjust the pre-heat temperature of heating element 130 based upon the number of consumers in detection area 190. In such embodiments, when a number of humans in detection area 190 increases, pre-heat temperature and/or cooking temperature may be increased from default pre-heat and cooking temperatures by control unit 150. Increasing the pre-heat temperature when multiple consumers are present may reduce the wait time for appliance 100 to reach the cooking temperature, allowing each user to prepare food more quickly. Further, increasing the cooking temperature allows for a reduced cooking time, which may also help to increase the rate at which the food can be prepared. Conversely, when few consumers are present in detection area 190 as determined by sensor 180, the pre-heat temperature may be maintained at the default pre-heat temperature, or may be reduced below the default in order to minimize energy usage during periods in which few consumers are present.

While appliance 100 is in use for preparing food, appliance 100 continues to detect motion or the presence of consumers in detection area 190. If humans are detected, appliance 100 may return heating element 130 to the pre-heat temperature upon completion of a cooking cycle. In this way, should another consumer choose to use appliance 100, appliance 100 will remain pre-heated. If no humans are detected by proximity sensor 180 upon completion of a cooking cycle, appliance 100 may return to stand-by mode with no heating of heating element 130 so as to conserve energy and minimize wear of appliance 100. In some embodiments, when no motion or no humans are detected, heating element 130 may remain at pre-heat temperature for a predetermined wait time, and if no humans are detected during the wait time, control unit 150 may deactivate heating element 130.

In some embodiments, the appliance 100 may be a waffle maker having a first heating plate 142 and a second heating plate 144. When waffle maker 100 is used to prepare a waffle, first heating plate 142 is heated to a first predetermined cooking temperature, and second heating plate 144 is heated to a second predetermined cooking temperature. In some embodiments, the first and second predetermined cooking temperatures are the same. However, as operation of waffle maker 100 generally requires a user to pour batter onto second heating plate 144 and subsequent close waffle mold 140 so that first heating plate 142 also contacts batter, second heating plate 144 is in contact with batter for a longer period of time than first heating plate 142. In order to avoid burning the batter due to the extra time the batter is in contact with second heating plate 144, second heating plate 144 may be heated to a predetermined cooking temperature that is lower than a cooking temperature of first heating plate 142. Alternatively, in order to account for the additional time the batter is in contact with only second heating plate 144 (e.g., before waffle mold 140 is closed), second heating plate 144 may be heated for a cooking time that is less than a cooking time of first heating plate 142. Other appliances having a first and second heating plate 142, 144, such as a panini press or an electric grill, may similarly heat a first heating plate 142 to a different temperature than a second heating plate 144, or may heat heating plates 142, 144 for a different amount of time.

In some embodiments, an appliance having a heating element such as a waffle maker 100 can be configured to collect usage data, and waffle maker 100 may activate heating element 130 of waffle mold 140 based at least in part on the usage data. In some embodiments, waffle maker 100 may determine the usage data in real-time as waffle maker 100 is used over a period of time, waffle maker 100 may learn through artificial intelligence, or waffle maker 100 may be pre-programmed to include usage data. In embodiments in which waffle maker 100 determines usage data in real-time, waffle maker 100 may record the time of each use of waffle maker 100 and may determine the number of uses and/or frequency of use of waffle maker 100. Waffle maker 100 may determine the times of use and frequency of use over a time period, such as over the course of one or more days. Waffle maker 100 may identify that the highest number of consumers are present in a particular time period, referred to as a "peak period." For example, when waffle maker 100 is deployed in a breakfast area of a hotel, the peak period may be from 7 AM to 9 AM. As a result, waffle maker 100 may automatically activate heating element 130 to a pre-heat temperature each day at 7 AM. Further, waffle maker 100 may identify that the peak period only occurs on certain days of the week, and thus activates heating element 130 only on those days. Alternatively, waffle maker 100 may increase the pre-heat temperature above a default pre-heat temperature during the peak period, and may increase the cooking temperature above the default cooking temperature during the peak period. Waffle maker 100 may also recognize that after 9 AM, waffle maker 100 is infrequently used or is not used, and thus waffle maker 100 may automatically return to stand-by mode at 9 AM, i.e., at the end of the peak period, or may set the pre-heat temperature to the default pre-heat temperature at 9 AM. Thus, waffle maker 100 may "learn" when to activate and deactivate heating element 130 based upon usage data, and the usage data may be pre-programmed, collected over time, or a combination thereof.

In some embodiments usage data may include a comparison of a number of uses of appliance 100 versus a number of potential uses. In such embodiments, sensor 180 may determine a number of humans in a detection area 190. The number of humans may be determined over a period of time, such as a period of one or more hours, e.g., during breakfast hours, or may be determined over a longer time period, such as over the course of a day. Appliance 100 may also determine each instance in which appliance 100 is actually used to prepare food. For example, a waffle maker may include a position sensor that detects when waffle maker is opened by lifting first heating plate 142 of waffle maker, such that each time waffle maker is opened, one use is counted. Alternatively, as appliance 100 determines the cooking time, one use may be recorded each time a cooking cycle is completed. Based on this information, an appliance 100 may determine the number of uses during a given period to allow the operator of appliance 100 to determine periods of heavy use and also allows the operator to determine the popularity of appliance 100. Further, appliance 100 may determine the number of uses versus the number of humans detected in the detection area in order to determine how many customers use the appliance versus the number of total consumers present. This may indicate whether appliance 100 is popular and is being used.

Further, as sensor 180 may determine the location of humans in a detection area 190, appliance 100 may also determine the paths traveled by the humans in detection area 190. Thus, location information provided to control unit 150 by sensor 180 allows for determination of traffic patterns through detection area 190. The traffic patterns may indicate that appliance 100 is positioned in an area that is less frequently trafficked by customers, which may indicate to an operator of appliance 100 that it may be beneficial to relocate appliance 100 to an area that is more frequently trafficked in order to encourage use of the appliance 100 by customers. Control unit 150 may generate graphical data showing the locations and paths of consumers through detection area 190 and may generate a heat map showing the locations and paths of consumers.

In some embodiments, appliance 100 may be configured to display the collected usage data, location information, or traffic patterns on a display 120. Alternatively or additionally, appliance 100 may include a communication interface configured to transmit, by wired or wireless communication, the collected usage data to an external device, such as a computer, a server, a smartphone, or the like. Appliance 100 may include a transmitter or transceiver for transmitting such information, or may include a port for being placed in connection with an external device. Communication interface may also allow appliance 100 to receive usage data so that appliance 100 can operate in accordance with usage data collected by another appliance.

Figure 6:
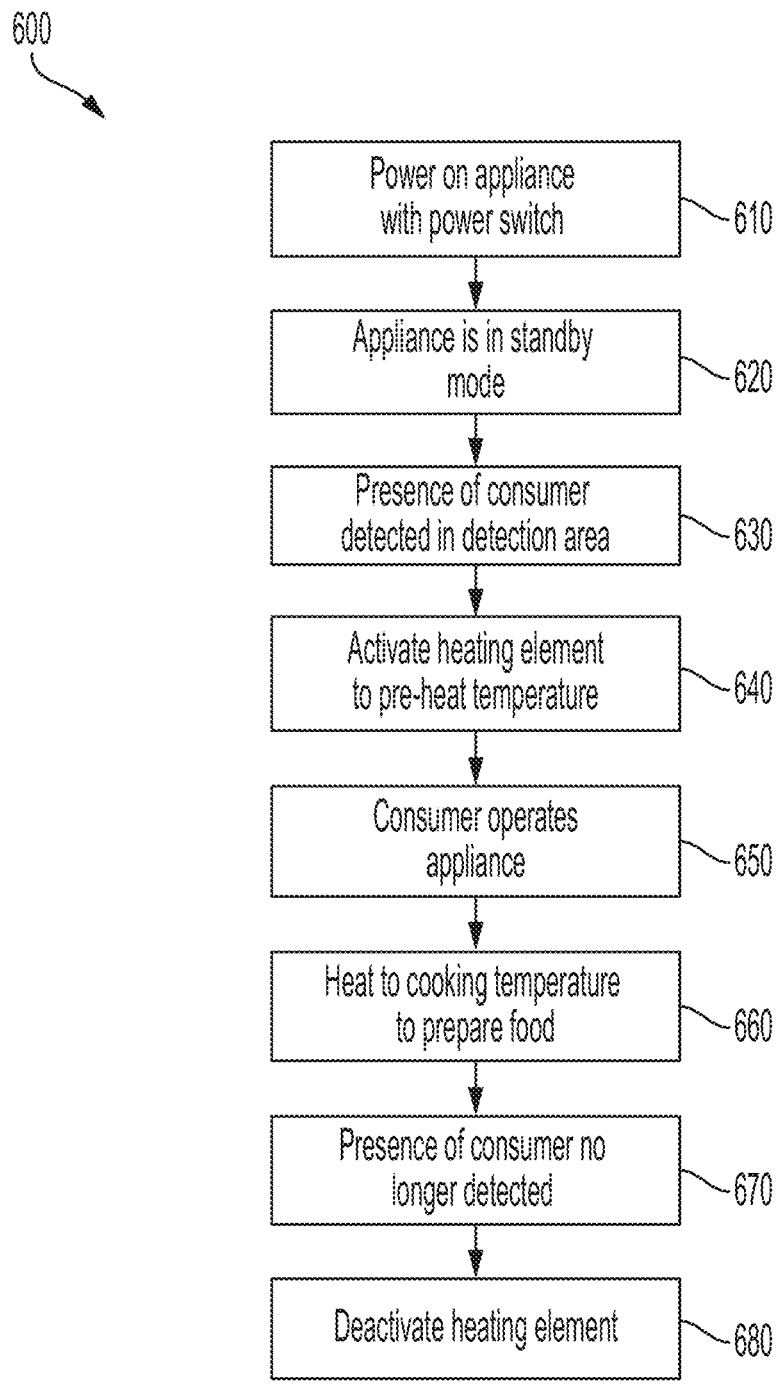
FIG. 6 shows a flow chart of the operation of an appliance according to an embodiment.

In an exemplary embodiment of the method of operating an appliance having a heating element 600, as shown in FIG. 6, the appliance may be powered-on using a power switch 610. Once powered on, the appliance remains in a stand-by mode 620 with heating element or elements inactive (i.e., at room temperature). Sensor detects motion or the presence of humans in a detection area 630. When motion or a presence of a human is detected by the sensor, control unit activates heating element to heat to a pre-heat temperature 640. A user may approach the appliance 100 to prepare or heat a food item. The user may operate the appliance 650 by placing food in contact with a heating plate heated by a heating element. For example, when appliance is a waffle maker, a user may operate the waffle maker by opening the waffle mold, pouring batter into the waffle mold, closing the waffle mold, and rotating the waffle mold 180 degrees to start the cooking cycle. The heating element of the appliance is heated to the cooking temperature 660 for a cooking time. The cooking time may be displayed on a display of the appliance. When the cooking time is complete, the user may remove the prepared food item. For example, when the appliance is a waffle maker, the user may remove the waffle and close the waffle mold to complete use of the waffle maker. The appliance may determine and record the time of use. The appliance may continue to detect motion or the presence of humans in detection area during and after the cooking cycle. After completing the cooking cycle, if no motion or no humans are detected in the detection area 670, control unit may deactivate heating element 680 so that the appliance is returned to stand-by mode until motion or the presence of humans is subsequently detected.

Figure 7:
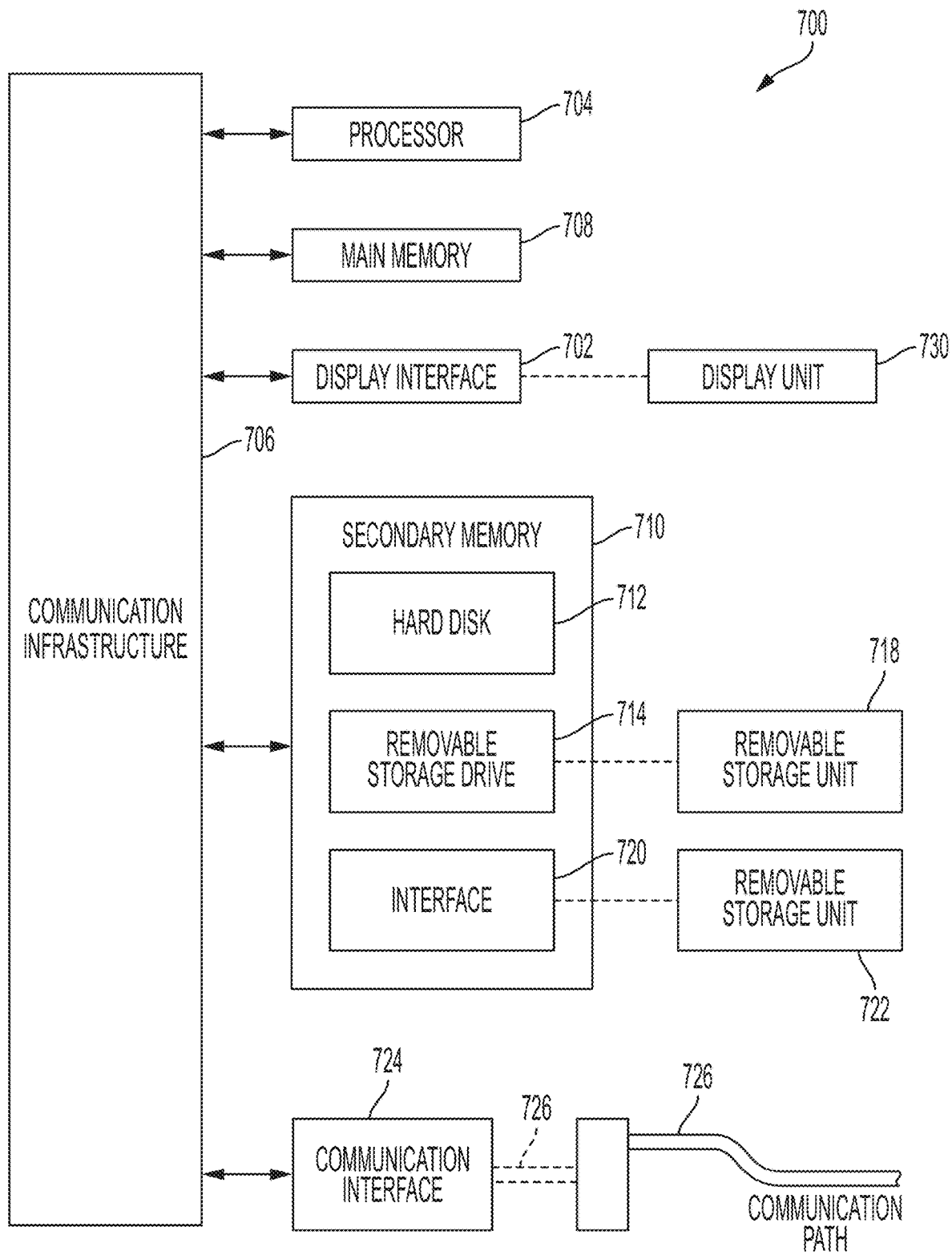
FIG. 7 shows a schematic block diagram of an exemplary computer system in which embodiments may be implemented.

FIG. 7 illustrates an exemplary computer system 700 in which embodiments, or portions thereof, may be implemented as computer-readable code. Control unit 150 as discussed herein may be computer systems having all or some of the components of computer system 700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 700. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, or removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, a universal serial bus (USB) drive, etc. which is read by and written to by removable storage drive 714. As will be appreciated by persons skilled in the relevant art, removable storage unit 718 includes a computer usable storage medium having stored therein computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 allows software and data to be transferred between computer system 700 and external devices. Communication interface 724 may include a modem, a network interface (such as an Ethernet card), a communication port, a PCMCIA slot and card, or the like. Software and data transferred via communication interface 724 may be in the form of signals, which may be electronic, electromagnetic, optical, or other signals capable of being received by communication interface 724. These signals may be provided to communication interface 724 via a communication path 726. Communication path 726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g., DRAMs, etc.).

Computer programs (also called computer control logic) are stored in main memory 708 and/or secondary memory 710. Computer programs may also be received via communication interface 724. Such computer programs, when executed, enable computer system 700 to implement the embodiments as discussed herein. In particular, the computer programs, when executed, enable processor device 704 to implement the processes of the embodiments discussed here. Accordingly, such computer programs represent controllers of the computer system 700. Where the embodiments are implemented using software, the software may be stored in a computer program product and loaded into computer system 700 using removable storage drive 714, interface 720, and hard disk drive 712, or communication interface 724.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A waffle maker, comprising:
   a base;
   a waffle mold supported by the base and having a first heating plate and a second heating plate, wherein the second heating plate is movable with respect to the first heating plate;
   a first heating element arranged on the waffle mold for heating the first and second heating plates;
   a sensor configured to detect motion in a detection area; and
   a control unit in communication with the sensor and the first heating element, wherein when the motion is detected in the detection area, the control unit heats the first heating element to a predetermined pre-heat temperature.

2. The waffle maker of claim 1, wherein the waffle mold comprises a hinge configured to allow the waffle mold to rotate 180 degrees about a longitudinal axis of the waffle maker.

3. The waffle maker of claim 1, wherein the detection area is an area within 15 feet of the proximity sensor.

4. The waffle maker of claim 1, wherein the sensor is a proximity sensor configured to detect a presence of a human in the detection area.

5. The waffle maker of claim 4, wherein the proximity sensor is a passive infrared sensor or a millimeter wave sensor.

6. The waffle maker of claim 4, wherein the proximity sensor is configured to determine locations of a plurality of humans in the detection area.

7. The waffle maker of claim 1, further comprising a temperature sensor configured to determine a temperature of the waffle mold.

8. The waffle maker of claim 1, further comprising a second heating element, wherein the first heating element is arranged on the first heating plate of the waffle mold, and the second heating element is arranged on the second heating plate of the waffle mold.

9. A method of operating a heating element of a waffle maker comprising a waffle mold supported by a base, wherein the waffle mold comprises a first heating plate and a second heating plate that is movable relative to the first heating plate, wherein the heating element is arranged on the waffle mold for heating the first and second heating plates, the method comprising:
   maintaining the waffle maker in a stand-by mode in which the heating element is at an ambient temperature;
   detecting motion in a detection area by a sensor of the waffle maker; and
   activating the heating element of the waffle maker when the motion is detected by the sensor such that the heating element is heated to a pre-heat temperature.

10. The method of claim 9, further comprising heating the heating element to a predetermined cooking temperature that is higher than the pre-heat temperature.

11. The method of claim 10, further comprising heating the heating element to the predetermined cooking temperature for a predetermined cooking time.

12. The method of claim 11, further comprising detecting a presence of a human by the sensor upon completion of the predetermined cooking time, and heating the heating element to the pre-heat temperature when the presence of a human is detected.

13. The method of claim 9, further comprising adjusting a temperature of the heating element based upon a number of humans in the detection area as detected by the sensor.

14. The method of claim 9, further comprising deactivating the heating element when the presence of a human is not detected by the sensor.

15. The method of claim 9, further comprising:
   generating usage data for the waffle maker by determining a time of use of the appliance and determining a number of uses of the waffle maker over a period of time; and
   activating the heating element based at least in part on the usage data.

16. The method of claim 9, further comprising generating usage data for the waffle maker by
   determining a number of humans in the detection area by the sensor of the waffle maker;
   determining a number of uses of the waffle maker; and
   comparing the number of humans to the number of uses of the waffle maker.

* * * * *